(12) United States Patent  
Windpassinger et al.

(10) Patent No.: US 7,408,714 B2
(45) Date of Patent: Aug. 5, 2008

(54) METHOD AND APPARATUS FOR COUPLING LASER BEAMS

(75) Inventors: Roman Windpassinger, Goettingen (DE); Frank Simon, Goettingen (DE)

(73) Assignee: Coherent, Inc., Santa Clara, CA (US)

( * ) Notice: Subject to any disclaimer, the term of this patent is extended or adjusted under 35 U.S.C. 154(b) by 253 days.

(21) Appl. No.: 11/350,514

(22) Filed: Feb. 9, 2006

(65) Prior Publication Data

US 2006/0182155 A1 Aug. 17, 2006

Related U.S. Application Data

(60) Provisional application No. 60/652,080, filed on Feb. 11, 2005.

(51) Int. Cl.
*G02B 27/14* (2006.01)
*G02B 27/10* (2006.01)
(52) U.S. Cl. .................. 359/629; 359/618; 359/639
(58) Field of Classification Search ............ 219/121.76; 250/492.1; 359/349, 618, 629, 639; 372/9, 372/108
See application file for complete search history.

(56) References Cited

U.S. PATENT DOCUMENTS

| 6,134,050 | A | * | 10/2000 | Conemac ................... 359/618 |
| 6,139,166 | A | * | 10/2000 | Marshall et al. ............ 362/231 |
| 6,535,531 | B1 | | 3/2003 | Smith et al. ................. 372/25 |
| 7,167,315 | B2 | * | 1/2007 | Watson et al. ............... 359/634 |
| 2004/0136417 | A1 | | 7/2004 | Webb et al. .................. 372/25 |
| 2004/0182838 | A1 | | 9/2004 | Das et al. ............... 219/121.76 |
| 2005/0259709 | A1 | | 11/2005 | Das et al. ..................... 372/55 |
| 2005/0286599 | A1 | | 12/2005 | Rafac et al. .................. 372/55 |
| 2006/0001878 | A1 | | 1/2006 | Das et al. ................... 356/400 |
| 2007/0279612 | A1 | * | 12/2007 | Maul .......................... 355/67 |

FOREIGN PATENT DOCUMENTS

DE 103 01 482 A1 1/2003

* cited by examiner

*Primary Examiner*—David N Spector
(74) *Attorney, Agent, or Firm*—Stallman & Pollock LLP

(57) ABSTRACT

In a photomask projection system, a photomask mask is illuminated by light from two lasers. A beam from one of the lasers is mixed with a beam from the other laser to provide two mixed beams each containing of portion of the beams from both lasers. The mixed beams are directed at an angle to each other and intersect on the photomask.

13 Claims, 8 Drawing Sheets

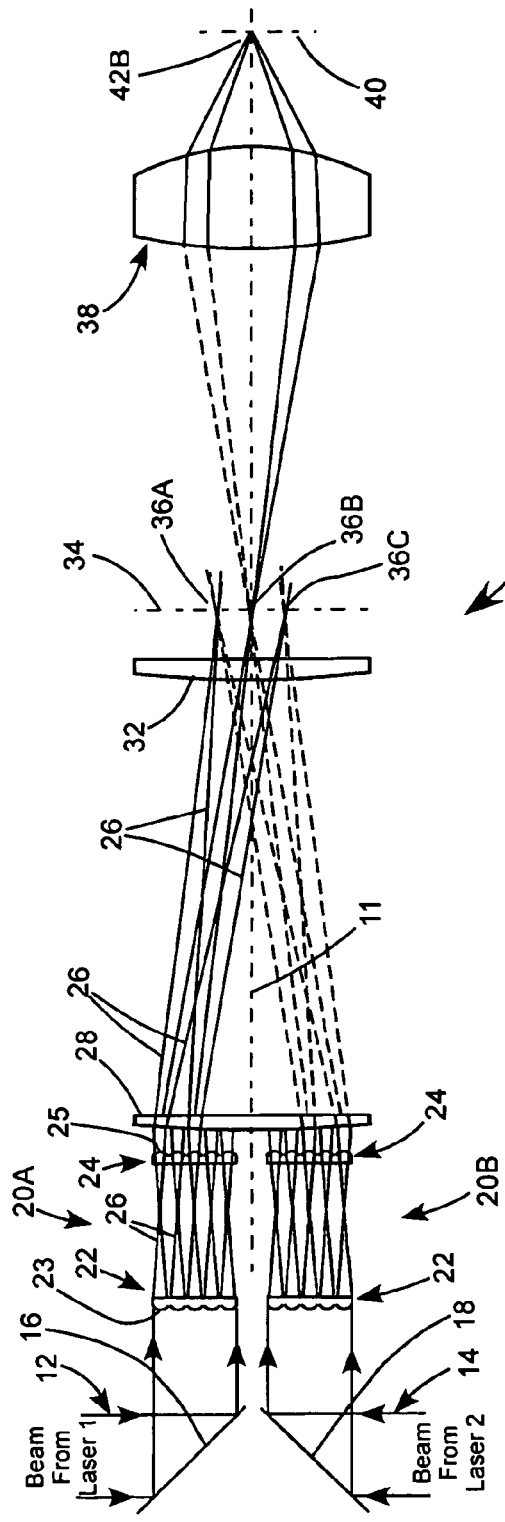
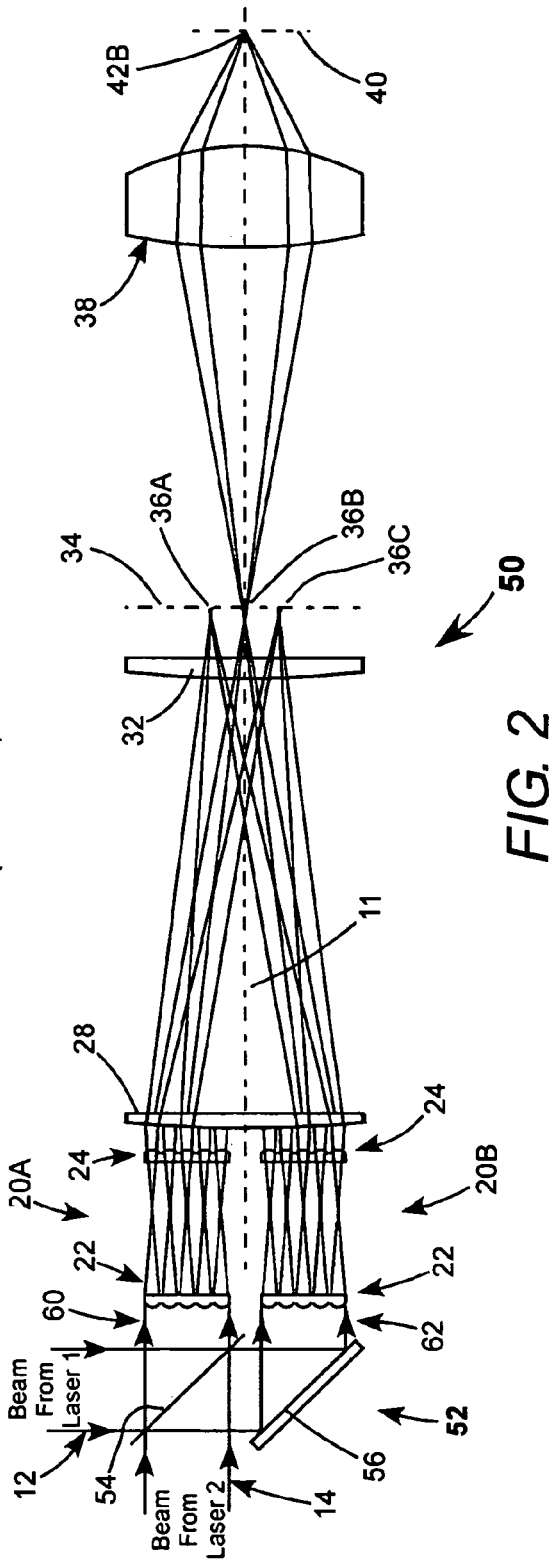

METHOD AND APPARATUS FOR COUPLING LASER BEAMS

PRIORITY

This application claims priority from U.S. Provisional Application Ser. No. 60/652,080, filed Feb. 11, 2005, the disclosure of which is incorporated herein by reference.

TECHNICAL FIELD OF THE INVENTION

The present invention relates in general to coupling of laser beams. The invention relates in particular to equalizing parameters of laser beams to be coupled either before the beams are coupled or as the beams are coupled.

DISCUSSION OF BACKGROUND ART

Coupling of two or more laser beams often becomes necessary if a beam from a single laser cannot provide sufficient power (if the beam is CW beam), sufficient average power (if the beam is a beam from a repetitively pulsed laser), or sufficient peak power (if the beam is repetitively-pulsed beam or an individually-pulsed beam) for a particular application.

Beam combining methods may be summarized as being of two different types. One type, which is often referred to as temporal interleaving, is used exclusively for combining beams from repetitively pulsed lasers. This type of combining is useful in applications in which an increased average power in a sequence of pulses is as advantageous, or preferable to, increasing the peak of pulses in a sequence thereof. In this method, beams from two or more repetitively-pulsed lasers having the same pulse repetition frequency (PRF) but having a phase difference therebetween are combined along a common path to provide a combined beam having two or more times the PRF of the individual beams and an average power which is about the sum of the average powers of the individual beams. Such a method is described in U.S. Pat. No. 5,999,555.

Temporal interleaving cannot be used when it is desired to combine beams either for increasing CW power or for increasing peak power in a pulse or a repeated sequence of pulses. Spatial combining methods have been used for this type of combination. Prior-art spatial beam combining methods include combining two plane-polarized beams which have orthogonally oriented polarization planes using a polarization-dependent transmissive and reflective beam combiner such as a McNeill biprism. This method however, is practically limited to combining only two beams, and is not practical for combining unpolarized beams. Methods for combining more than two beams include combining beams having slightly different wavelengths using a diffraction grating, prism or dichroic mirror. This method is only useful however in applications that are insensitive to the bandwidth of radiation. Another method of combining two or more beams is simply to cause the beams to propagate at an angle to each other and overlap in a common area in a plane in which a substrate being treated by the combined beams is located. This may be termed oblique coupling and the beams are only coupled at the location at which they intersect.

In most applications requiring a plurality of laser beams to be coupled into a single beam or into a common area, whatever coupling method is employed, it is important, at least, that the light-intensity distribution across the coupled beams not be influenced by variations in the intensity distribution in individual laser beams. This is particularly true in very high-power excimer-laser-illuminated photomask (mask) projection systems used in material processing applications, or in optical lithography applications used in semiconductor device manufacture. One step that has been proposed to at least partially achieve such a result is to subject each of the beams to be combined to a beam homogenization step, before the beams are coupled. This is disclosed in detail in German Patent Publication No. DE10301482, and is described briefly below with reference to FIG. 1.

FIG. 1 is substantially reproduced from the German '482 publication, and depicts a photomask imaging (projection) apparatus 10 in which a beam 12 from one laser, and beam 14 from another laser, initially propagating toward each other, are caused to propagate parallel to each other by mirrors 16 and 18, respectively. Beam 12 is homogenized with the aid of a homogenizer 20A including the cylindrical lens arrays 22 and 24. Beam 12 is incident on cylindrical lens array 22 and cylindrical lenses 23 in the array divide the beam into a plurality of ray-bundles 26 with rays in each bundle initially converging. Ray bundles pass through an intermediate focus from which rays in the bundles diverge, and are incident on corresponding cylindrical lenses 25 of cylindrical lens array 24. Beam 14 undergoes this same division and optical operation in a homogenizer 20B identical with homogenizer 20A.

Bundles 26 are individually divergent on exiting cylindrical lens array 24 and propagate parallel to each other. The bundles are intercepted by a collecting or condenser lens 28 arranged on an optical axis 11. Homogenizers 20A and 20B are disposed symmetrically on opposite sides of axis 11. Lens 28 reduces the individual divergence of bundles 26 and causes the beams to be mutually convergent, causing the bundles to intersect in a plane 34 (mask plane or object plane) in which a photomask (object) would be located. A field lens 32 close to the mask plane further reduces the individual divergence of the bundles enabling them to pass the entrance pupil of the projection lens 38.

Because of the symmetrical arrangement of the homogenizers about axis 11, ray bundles from homogenizer 20B also intersect with each other, and with ray bundles from homogenizer 20A, such that, in plane 34, homogenized beams 12 and 14 are effectively coupled and the intensities of the beams are summed. Object points 36A, 36B, and 36C in plane 34 are imaged by a projection lens 38 into an image plane 40 in which a substrate would be located to receive a mask image, as is known in the art. Only one image point 42B (an on-axis image point) is depicted in FIG. 1 for economy of illustration.

It has been determined that in the above-described beam coupling apparatus the homogenization of the beams prior to coupling is insufficient in itself to provide uniform, temporally-constant illumination in image plane 40. This is believed to be a result of one or more of the following problems.

As may be seen in FIG. 1, ray pencils originating from homogenizers 20A and 20B (laser 1 and laser 2) are incident in mask plane 34 at different angular directions, and consequently fill complementary portions of the projection cone converging on the image plane 40, as exemplified for image point 42B. Only under perfect imaging conditions, for example diffraction limited, and, in particular, if image plane 40 and the substrate surface perfectly coincide, will the image power distribution be independent of the angular distribution.

Under practical conditions, some deviation from this perfect condition has to be reckoned with, for example, because of residual field curvature of the projection lens 38, or because of dynamic variation of the substrate plane position with respect to the image plane 40 during high speed scanning operation. In order to counter these deviations, the projection lens is typically designed to be telecentric, with the tacit assumption of angular symmetric illumination.

However, if, for example, the powers of the beams leaving the two homogenizers 20A and 20B differ, or in the case of interleaving laser operation, the illumination cones for each image point will show an asymmetric angular power distribution, and the telecentricity of the image projection is impaired, giving rise to variations of the image power distribution (shot-to-shot variations) under practical operation conditions. Another problem, albeit less severe is as follows The illumination provided by any one beam in plane 34 is asymmetric because of the non-symmetrical oblique incidence of rays in the plane. Rays from beam 14, incident in plane 34, are shown in dashed lines to highlight this. The coupling method relies on there being an exactly complimentary asymmetry in one beam compared with the other. Accordingly, if the power in the two beams is different there will be some residual asymmetry of illumination in plane 34 in which the beams are coupled.

Precise intersection of the beams requires that the pointing of beams to be constant. Unfortunately, in high-power lasers of any kind, this is rarely the case. Pointing varies temporally, and differences in pointing in beams 12 and 14 may lead to poor definition and variable illumination at edges of the area illuminated in plane 34. Finally, but not exhaustively, when the beams are delivered by pulsed lasers, the pulses in each beam must preferably be synchronized to at least consistently, if not exactly, overlap in time. In excimer laser beams, where pulses may have a duration as short as about 20 nanoseconds (ns) or less, an exact or consistent temporal overlap is very difficult to achieve. This can lead, for example, to illumination in plane 34 having, at the leading edge of the pulse, primarily the characteristics of one laser beam, and at the trailing edge of the pulse the characteristics of the other laser beam.

Clearly, while the above-discussed problems are discussed in the context of one particular method of beam coupling at least one of the problems would be encountered in other beam coupling methods. Accordingly, there is a need for a method of solving or at least mitigating these problems to expand the use of beam coupling methods for delivering high laser power or laser energy.

SUMMARY OF THE INVENTION

The present invention is directed to a method and apparatus for combining a plurality of laser beams. In one aspect, a beam combining method in accordance with the present invention comprises mixing the plurality of laser beams to provide a plurality of mixed beams. The mixing is effected such that each of the mixed beams includes at least one portion of each of the laser beams.

Mixing the beams is preferably effected such that the portions of each laser beam in each mixed beam are about equal. This provides that the mixed beams have about equal characteristics.

The mixed laser beams can then be combined by a prior-art beam combination method. The inventive method is particularly advantageous in excimer-laser photomask projection apparatus wherein a photomask is illuminated by the combined output of two excimer lasers. Here, a preferred embodiment of the inventive beam combining method includes mixing beams from the two excimer lasers to provide two mixed beams, each containing a portion of each of the two excimer laser beams. The two mixed beams are obliquely coupled, i.e., the mixed beams are directed toward each other in such a way that the mixed beams intersect on the mask, such that the mask is illuminated by the combined intensities of the beams.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 1 schematically illustrates prior-art apparatus for homogenizing and coupling two individual laser beams in a mask plane of photomask projection apparatus for illuminating a photomask mask, the image of which is to be projected.

FIG. 2 schematically illustrates a preferred embodiment of an apparatus in accordance with the present invention, similar to the apparatus of FIG. 1, but including one preferred embodiment of a beam-mixer in accordance with the present invention, arranged to mix the two individual beams to provide two mixed beams, each including a proportion of each of the individual beams, and wherein the two mixed laser beams are coupled into the mask plane of the photomask projection apparatus for illuminating a mask, the image of which is to be projected.

DETAILED DESCRIPTION OF THE INVENTION

Figure 3:
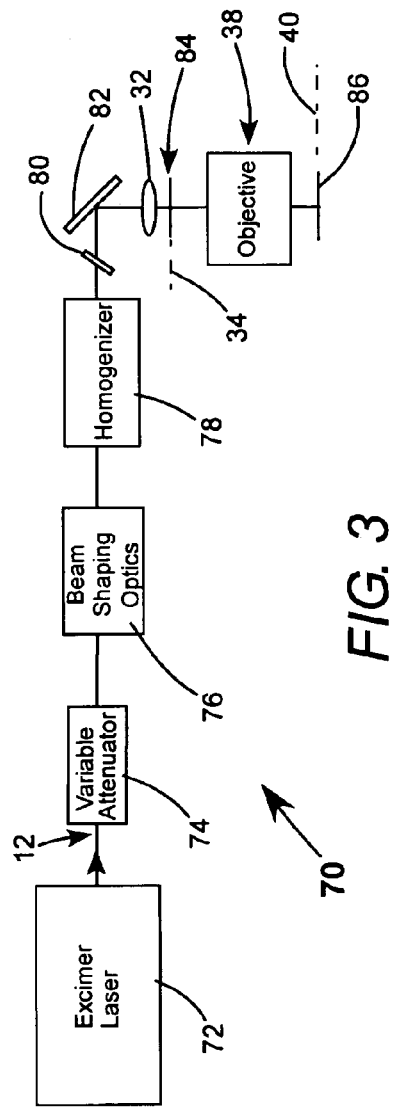
FIG. 3 schematically illustrates, in ftunctional block diagram form, a prior-art excimer laser photomask projection apparatus including one excimer laser, a variable attenuator for regulating power in a beam emitted by the laser, beam-shaping optics for changing the cross-section shape of the laser beam, a homogenizer for homogenizing the shaped laser beam, and a field lens for projecting the laser the laser beam onto the mask.

Referring now to the drawings, wherein like features are designated by like reference numerals, FIG. 2 schematically illustrates a photomask imaging arrangement 50 including one embodiment of a beam-coupling method in accordance with the present invention. The method is described with reference to the prior-art beam-coupling method depicted in apparatus of FIG. 1 for convenience of description and to highlight advantages of the inventive method.

In apparatus 50, the arrangement of homogenizers 20A and 20B, collecting lens 28, and field lens 32 for causing two beams to be homogenized, and obliquely coupled in plane 34, is similar to that of apparatus 10 of FIG. 1. In apparatus 50, however, beams 12 and 14 from the two lasers are incident on an inventive optical arrangement that may be described as a beam-mixer or pre-coupler 52, including a beamsplitter 54 and a mirror 56 in this embodiment thereof. This beam-mixer provides, from beams 12 and 14 that have individual characteristics including, power, temporal (e.g. pulse-duration and relative phase), azimuthal (e.g. pointing), spatial (e.g. intensity distribution) characteristics, two combined or mixed beams 60 and 62. Each of these mixed beams has some proportion of all such characteristics of beams 14 and 16. It is these mixed beams that are obliquely coupled in the manner discussed above with reference to the prior-art apparatus. Preferably, each of the mixed beams combines equal portions of the individual laser beams.

In beam-mixer 52, beams 12 and 14 are initially propagating on paths perpendicular to each other, and are arranged to be coincident on opposite sides of a beamsplitter 54. It is assumed, here, for convenience of description, that the beamsplitter is a lossless beamsplitter having a reflectivity R and a transmission T for the wavelength of radiation in the beams. It is assumed that mirror 56 is 100% reflective. It is also assumed that beam 12 has a nominal intensity $I_1$, and beam 14 has a nominal intensity $I_2$. A portion of beam 12 is transmitted by the beamsplitter to a mirror 56, and the remaining portion of beam 12 is reflected from beamsplitter 54 toward homogenizer 20A. A portion of beam 14 is transmitted by beamsplitter 54 along the same path as the reflected portion of beam 12 toward homogenizer 20A. These portions form mixed beam 60. The remaining portion of beam 14 is reflected by beamsplitter 54 along the same path as the transmitted portion of beam 12 to mirror 56 which reflects both beam portions along a common path to homogenizer 20B as mixed beam 62. The nominal intensity in beam 60, given the above-discussed assumptions, will be $R*I_1+T*I_2$. The nominal intensity in beam 62 will be $T*I_1+R*I_2$.

It can be seen that, as far as intensity is concerned, with an exact 50:50 mixing of beams 12 and 14, each of combined beams 60 and 62 will have about the mean of the intensities of the two beams. Any change in intensity in any one of the individual beams will be reflected equally in both mixed beams, thereby providing and preserving symmetry of illumination in plane 34. As far as temporal pulse characteristics are concerned, the pulse characteristics in each beam will be a temporal sum of the characteristics of the individual beams. Those skilled in the art will recognize further characteristics of the mixed beams without further description here. Those, skilled in the art will also recognize, without further illustration or detailed description, that while mixer 52 is described as mixing two beams propagating perpendicular to each other, beams propagating in other relative orientations can be directed into the mutually perpendicular orientation by one or more additional mirrors.

It should be noted that while separate homogenizers are depicted in FIG. 2 for the mixed beams, a single homogenizer may be provided, having sufficiently large entrance and exit apertures that both of the mixed beams can enter and leave the homogenizer. Further, while a single lens element 38 is depicted as being used as a projection objective, a multi-element objective or a reflective objective such as a Schwarzschild objective may be substituted without departing from the spirit and scope of the present invention. Further still, while the homogenizers are described and depicted as including one pair of cylindrical lens arrays, an arrangement including two pairs of cylindrical lens arrays, (one pair for each transverse beam axis) with cylindrical elements of each pair crossed, may be used. Homogenizers may even employ some other known optical arrangement for beam homogenizing.

Suitable locations in an optical system for a beam mixer in accordance with the present invention are next discussed below with continuing reference to an excimer laser photomask projection system, of which apparatus similar to prior-art apparatus 10 would be a part. FIG. 3 schematically depicts basic functional units of such a system 70 in accordance with the prior art. The system includes an excimer laser 72 that emits a beam 12 which typically has a rectangular cross-section. The beam traverses a variable attenuator 74 for adjusting beam power, and then traverses a beam-shaping unit 76, such as an afocal anamorphic telescope. The beam-shaping unit includes optical elements arranged to change the aspect-ratio or absolute dimensions of the beam cross-section for further optical processing. The shaped beam then enters a homogenizer 78 which can include one or two pairs of cylindrical lens arrays (not shown). The beam from the homogenizer 72 traverses a beamsplitter 80, which samples a portion (not shown) of the beam for diagnostic purposes. A turning mirror 82 then directs the beam to a field lens that projects the beam onto a mask 84 in a mask plane 34. A projection lens (objective) 38 images the mask on a substrate 86 in an image plane 40.

Figure 4:
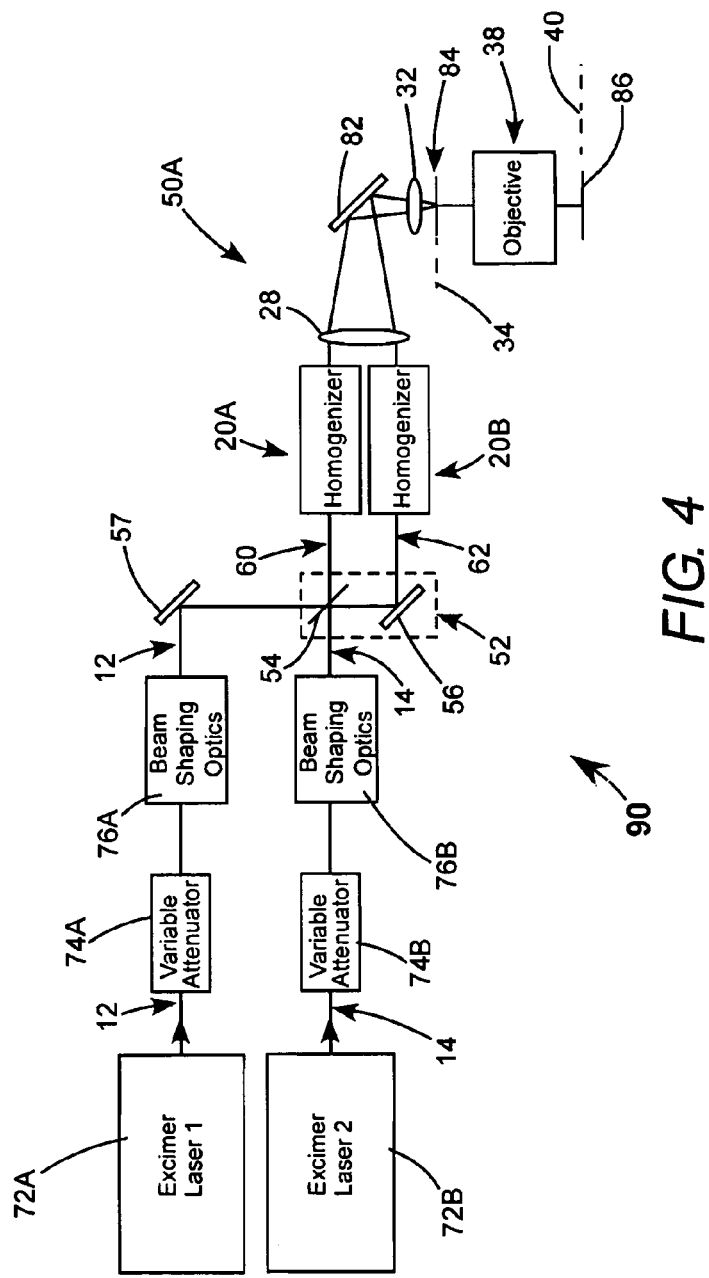
FIG. 4 schematically illustrates in functional block diagram form one preferred embodiment of an excimer laser photomask projection apparatus in accordance with the present invention including two excimer lasers each providing a laser beam, two variable attenuators and two beam-shaping optics, one each for each beam, a beam mixer in accordance variable attenuator arranged to receive the attenuated shaped laser beams from the beam-shaping optics and mix the beams to provide two mixed beams, and wherein two homogenizers, a collecting lens and a field lens are arranged to obliquely couple the mixed beams on a photomask.

FIG. 4 schematically illustrates, in functional block diagram form, block one embodiment 90 of an excimer laser photomask projection apparatus in accordance with the present invention including two excimer lasers 72A and 72B delivering laser beams 12 and 14 respectively. Beam12 traverse a variable attenuator 74A and beam-shaping optics 76A. Beam 14 traverses a variable attenuator 76B and beam-shaping optics 76B. Beams 12 and 14 then enter an optical arrangement 50A that functions in the same way as above-described apparatus 50 of FIG. 2. In apparatus 50A, as in apparatus 50, beams 12 and 14 are mixed in beam mixer 52 by a beamsplitter 54 and a mirror 56 to provide two combined or mixed beams 60 and 62. Beams 60 and 62 then traverse homogenizers 20A and 20B respectively and the homogenized beams are caused by a lens 28 to converge and intersect (couple) in mask plane 34 to illuminate a mask 84 located in the mask plane. A projection lens (objective) 38 images the mask on a substrate 86 in an image plane 40 as described above with respect apparatus 30.

Figure 5:
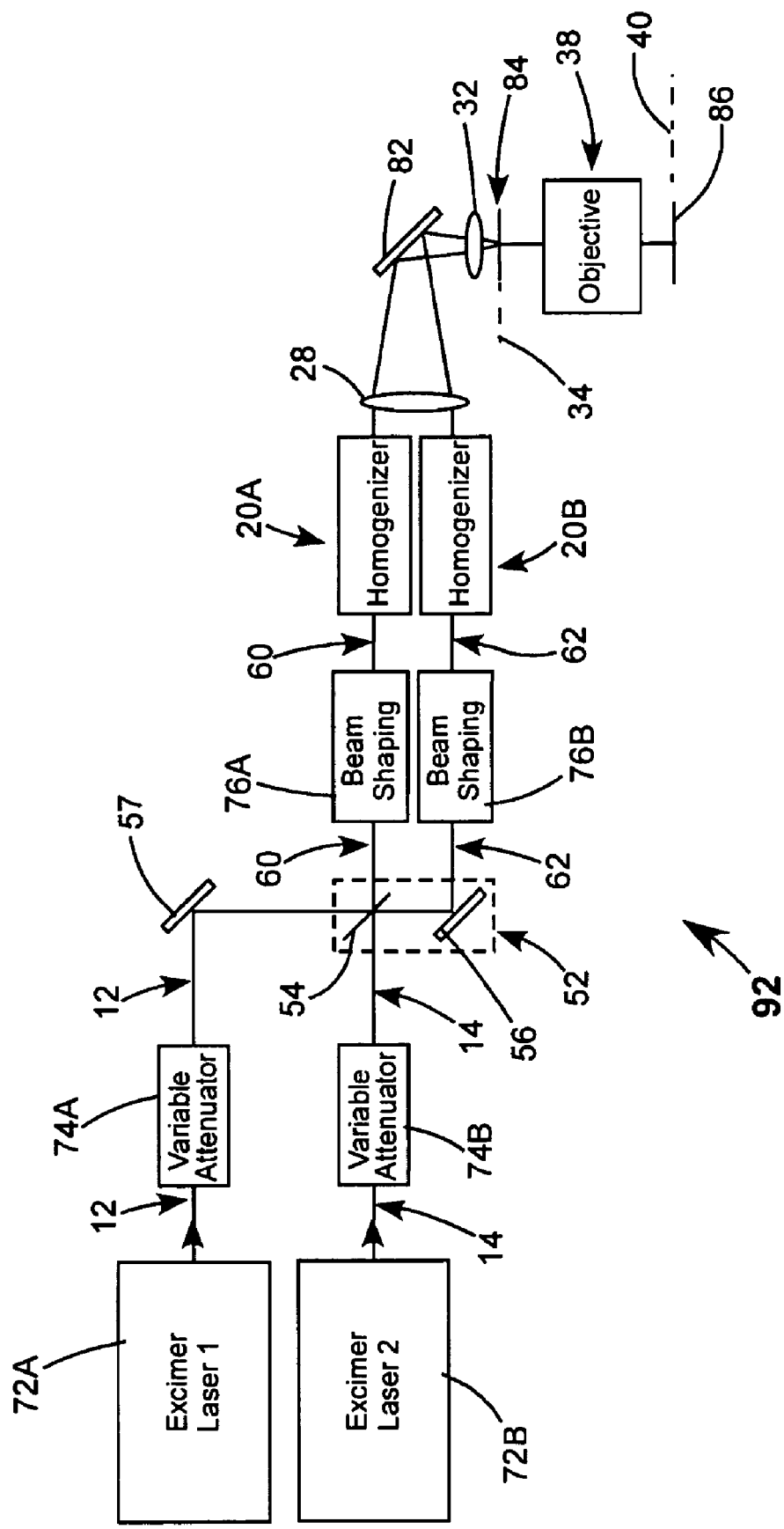
FIG. 5 schematically illustrates in functional block diagram from another preferred embodiment of an excimer laser photomask projection apparatus in accordance with the present invention similar to the apparatus of claim 1, but wherein the beam mixer receives individual beams from the variable attenuators mixes the beams to provide two mixed beams, delivers the shaped mixed beams to the beam-shaping optics which deliver the shaped mixed beams to the two homogenizers.

FIG. 5 schematically illustrates, in functional block diagram form, another embodiment 92 of an excimer laser photomask projection apparatus in accordance with the present invention. Apparatus 92 is similar to apparatus 90 with an exception that beam-mixer 52 is located in the apparatus ahead of the beam-shaping optics 76A and 76B. The mixing apparatus may be located in any other location in the system where the laser beams are separated.

In the detailed description of beam mixer 52 described above, beamsplitter 54 is exemplified, for convenience of description, as being lossless, and having exactly equal reflectivity and transmission, independent of polarization, at the wavelength of beams being mixed. Those skilled in the art will recognize that in practice it will probably not be possible to obtain a beamsplitter from commercial suppliers that has such exact properties, particularly for wavelengths in the ultraviolet spectral region at which excimer lasers deliver radiation. In most instances, however, particularly if beams 12 and 14 are unpolarized, commercially available beamsplitters will provide sufficiently adequate beam-mixing, and the one-beamsplitter-one-mirror arrangement of beam-mixer 52 will significantly reduce above described problems in achieving uniform and temporally stable illumination of a mask plane with two obliquely-coupled laser beams.

In other apparatus, it may be required to mix and couple three or more laser beams to achieve a more thorough mixing of beams than is possible in a practical realization of the one-beamsplitter-one-mirror arrangement of beam-mixer 52. A brief description of embodiments of the inventive beam mixer that can satisfy such requirements is set forth below beginning with reference to FIG. 6.

Figure 6:
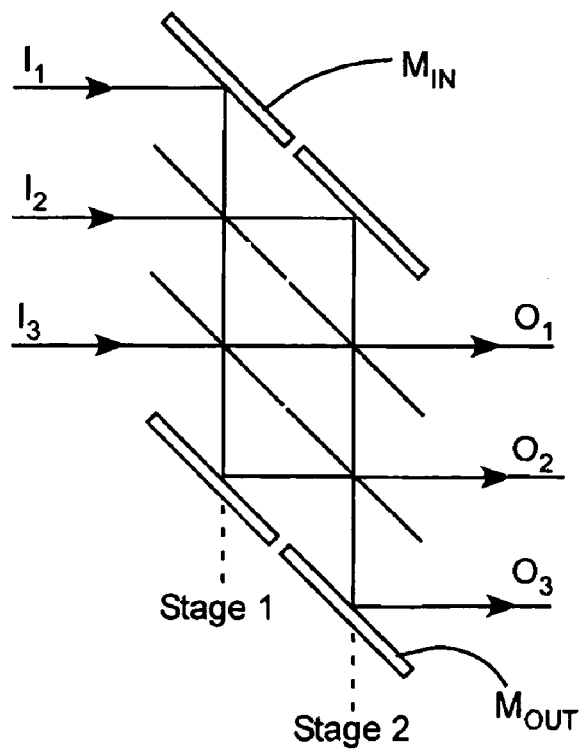
FIG. 6 schematically illustrates an embodiment of a beam-mixer in accordance with the present invention arranged to mix three input beams to provide three mixed output beams in two stages of mixing.

FIG. 6 schematically illustrates an embodiment 53 of a beam-mixer in accordance with the present invention for mixing three input beams $I_1$, $I_2$, and $I_3$ to provide three mixed (combined) output beams $O_1$, $O_2$, and $O_3$, each of which contains some proportion of each of the input beams. In FIG. 6, and in similar drawings depicting other embodiments of the inventive mixer referred to hereinbelow, only particular mirrors or beamsplitters are designated by a specific reference numeral. In all such drawings a mirror is represented by an elongated narrow rectangle and a beamsplitter is represented by a single line. A laser beam is represented by a single line indicating the path of the beam, whether or not the beam may contain one or more portions of one or more other laser beams. Such a mixer could be incorporated in an apparatus similar to apparatus 90 of FIG. 4, but wherein there were three homogenizers ahead of lens 28, with one on the optical axis of the lens and two disposed symmetrically on opposite sides of the optical axis.

Continuing with reference to FIG. 6, in beam-mixer 53, beam-mixing is accomplished in two stages (designated Stage 1 and Stage 2) with each stage requiring one mirror and two beamsplitters. Mirrors $M_{IN}$ and $M_{OUT}$ do not contribute to the mixing process, and function only to provide parallel input and output for the three input beams and three output (mixed) beams. It should be noted that two mixing stages are required here to satisfy a requirement that beams $O_1$, $O_2$, and $O_3$, each contains some proportion of each of the input beams. Were there only a single mixing stage (Stage 1), only beams $O_2$ and $O_3$ would include proportions of beams $I_1$, $I_2$, and $I_3$. Beam $O_1$ would contain only portions of beams $I_1$ and $I_2$.

Figure 7:
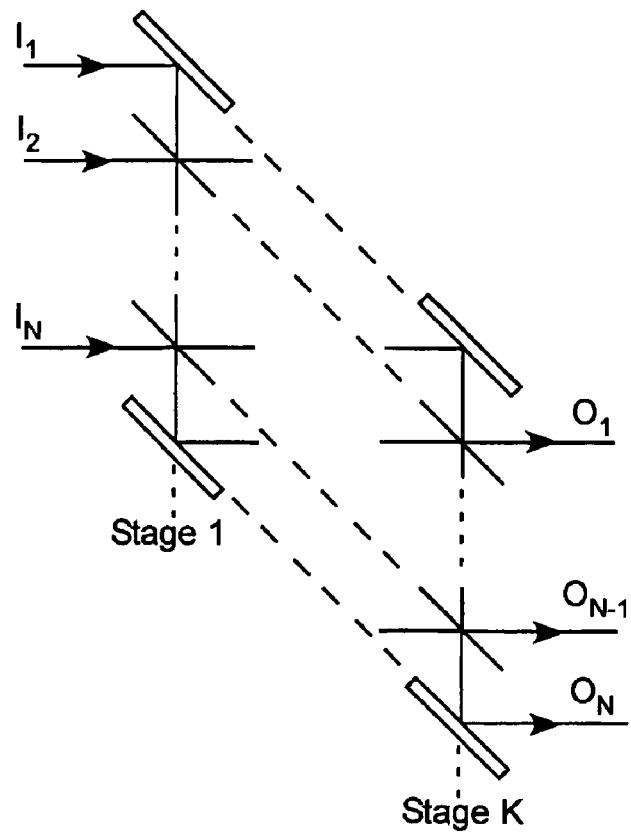
FIG. 7 schematically illustrates an embodiment of a beam-mixer in accordance with the present invention, in generalized form, arranged to mix N input beams to provide N mixed output beams in K stages of mixing.

FIG. 7 schematically illustrates the concept of FIG. 3 in a general form for mixing N input beams ($I_1$, $I_2$, . . . . $I_N$), in K mixing stages, to provide N output beams ($O_1$, $O_2$, . . . . $O_{N-1}$, $O_N$). Each mixing stage would include one mirror and N–1 beamsplitters. In order to satisfy a requirement that each output beam include a portion of each input beam, K–1 mixing stages would be required.

Theoretically, the number of input beams N is not limited. Assuming the beam splitters all have the same transmission and reflectivity, increasing K makes the intensity distribution of the output beams converge rapidly towards the mean of all input intensities, that is, an input intensity $A_N$ contributes to each output in the limit with $A_N/N$ (neglecting absorption and other losses). This holds for any transmission value $0<T<1$, or reflectivity $0<R<1$, respectively.

Figure 8:
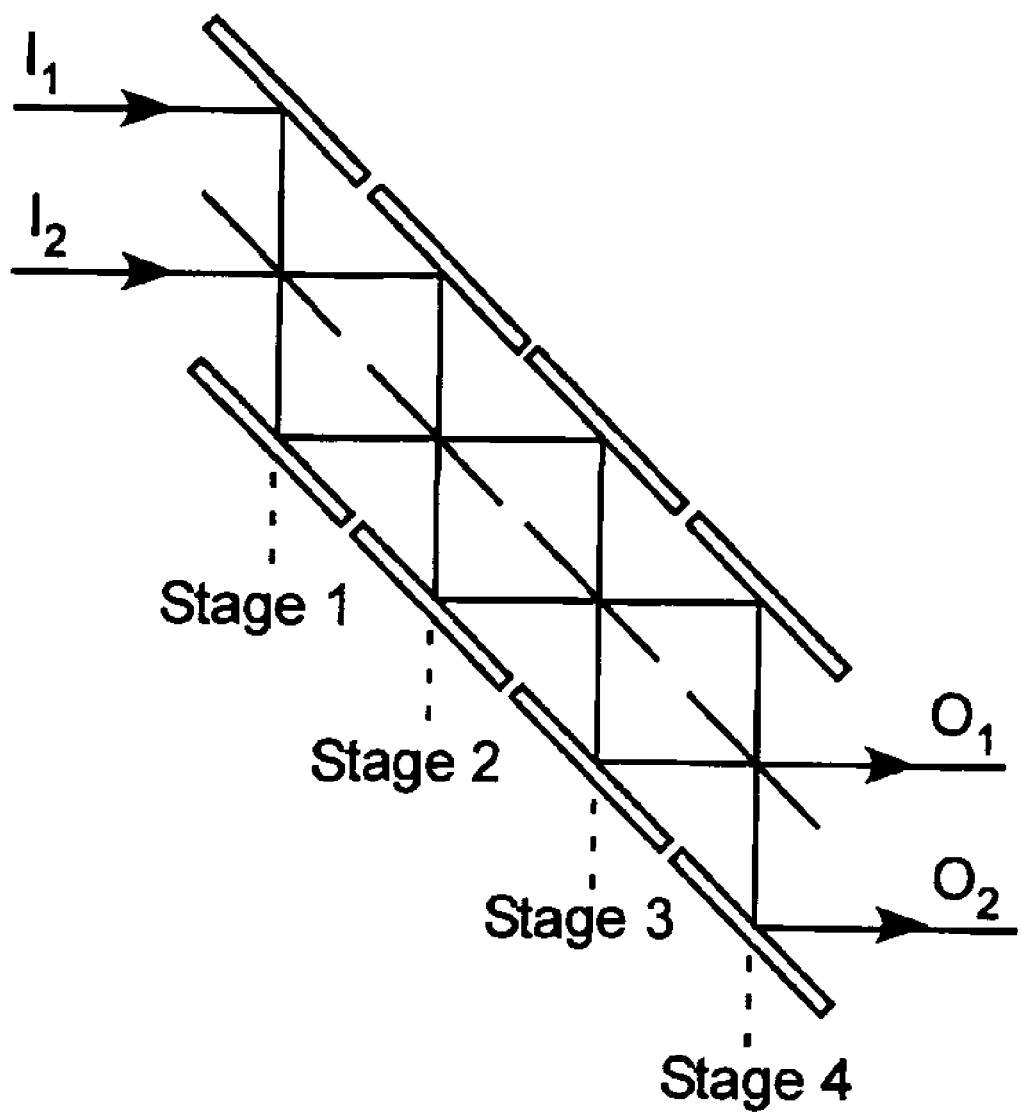
FIG. 8 schematically illustrates an embodiment of a beam-mixer in accordance with the present invention arranged to mix two input beams to provide two mixed output beams in four stages of mixing.

Differences in total intensity between the beams, as well as arbitrary beamsplitter transmission and reflectivity values T and R can be compensated for by adding an appropriate number of stages to the minimum of K=N–1. This is depicted in FIG. 8 in the form of a mixer in accordance with the present invention mixing input beams I1 and I2, to provide mixed output beams $O_1$ and $O_2$ in four stages. Nonetheless, the beam splitter T and R values should be chosen appropriately to minimize output differences. The appropriate values for T and R will depend on the number of input beams.

In practice, it is difficult to provide beam splitter with R and T values independent of polarization orientation. A beamsplitter will usually transmit and reflect the two mutually orthogonally orientated polarization components with different R and T for each components, even though the difference may be relatively small. As noted above, coatings for beam splitters can be provided that achieve almost equal T-R ratios in both polarization orientations within relatively narrow wavelength bands, for example, bands that are no more than a few nanometers wide. However, the forgoing implies that the effect of mismatched T-R-ratios can be minimized by using a sufficient number of mixing stages.

In embodiments of the inventive beam mixers described above, a mixing stage for mixing N beams includes one mirror and N–1 beamsplitters. Set forth below is a description of embodiments of the inventive beamsplitter in which a single mixing stage for mixing N beams includes one mirror and 2*(N–1) beamsplitters, with any subsequent stages having one mirror and N–1 beamsplitters. These embodiments of the inventive beamsplitter can provide that each output beam includes at least two portions of each input beam with the orientation of the cross-section of one of the beam portions "flipped" by 180° with respect to the other.

Figure 9:
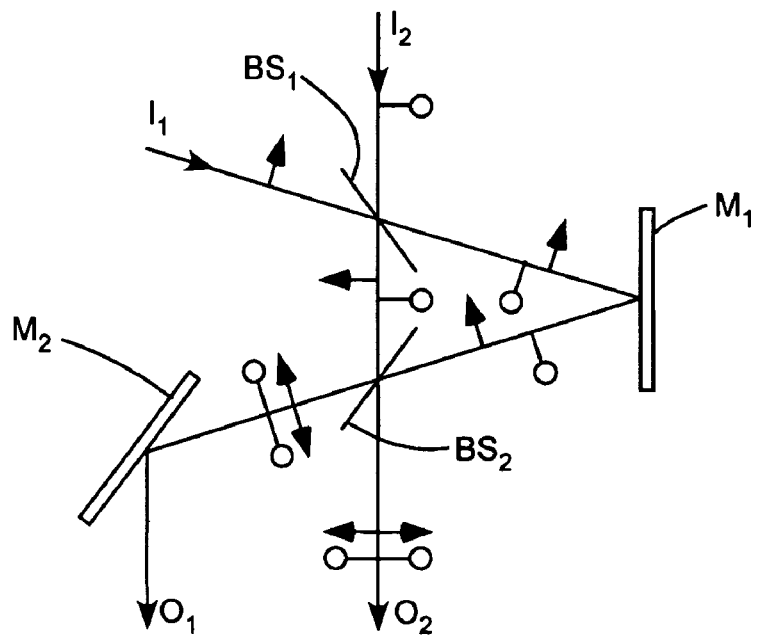
FIG. 9 schematically illustrates an embodiment of a beam-mixer in accordance with the present invention arranged to mix two input beams to provide two mixed output beams in a single stage of mixing.

FIG. 9 schematically illustrates an embodiment of a beam-mixer in accordance with the present invention for mixing two beams $I_1$ and $I_2$ in a single stage. The orientation of the cross-section of beam I1 and portions thereof is designated by a line perpendicular to the beam path and topped with an arrowhead. The orientation of the cross-section of beam of beam $I_2$ and portions thereof is designated by a line perpendicular to the beam path and topped with a circle. The cross section orientations may be referred to as the transverse orientations of the beam. Those skilled in the art will recognize that the flipping of the orientation occurs in reflection at the mirrors and beamsplitters. In this embodiment, the mixing stage comprises mirror $M_1$ and beamsplitters $BS_1$, and $BS_2$. Mirror $M_2$ serves to make the output beams parallel to each other. One skilled in the art will recognize from the illustration how the beams are divided and how portions thereof are reassembled. Provision of the orientation indicators serves to illustrate how the input beams are divided and portions thereof recombined, and how output beams $O_1$ and $O_2$ contain portions of each input beam in opposite orientations.

Figure 10:
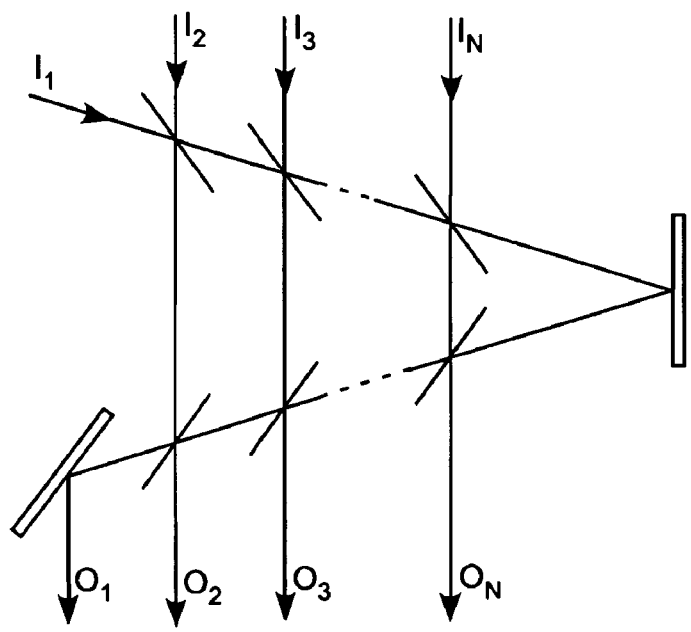
FIG. 10 schematically illustrates an embodiment of a beam-mixer in accordance with the present invention, in generalized form, arranged to mix N input beams to provide N mixed output beams in a single of mixing.
Figure 11:
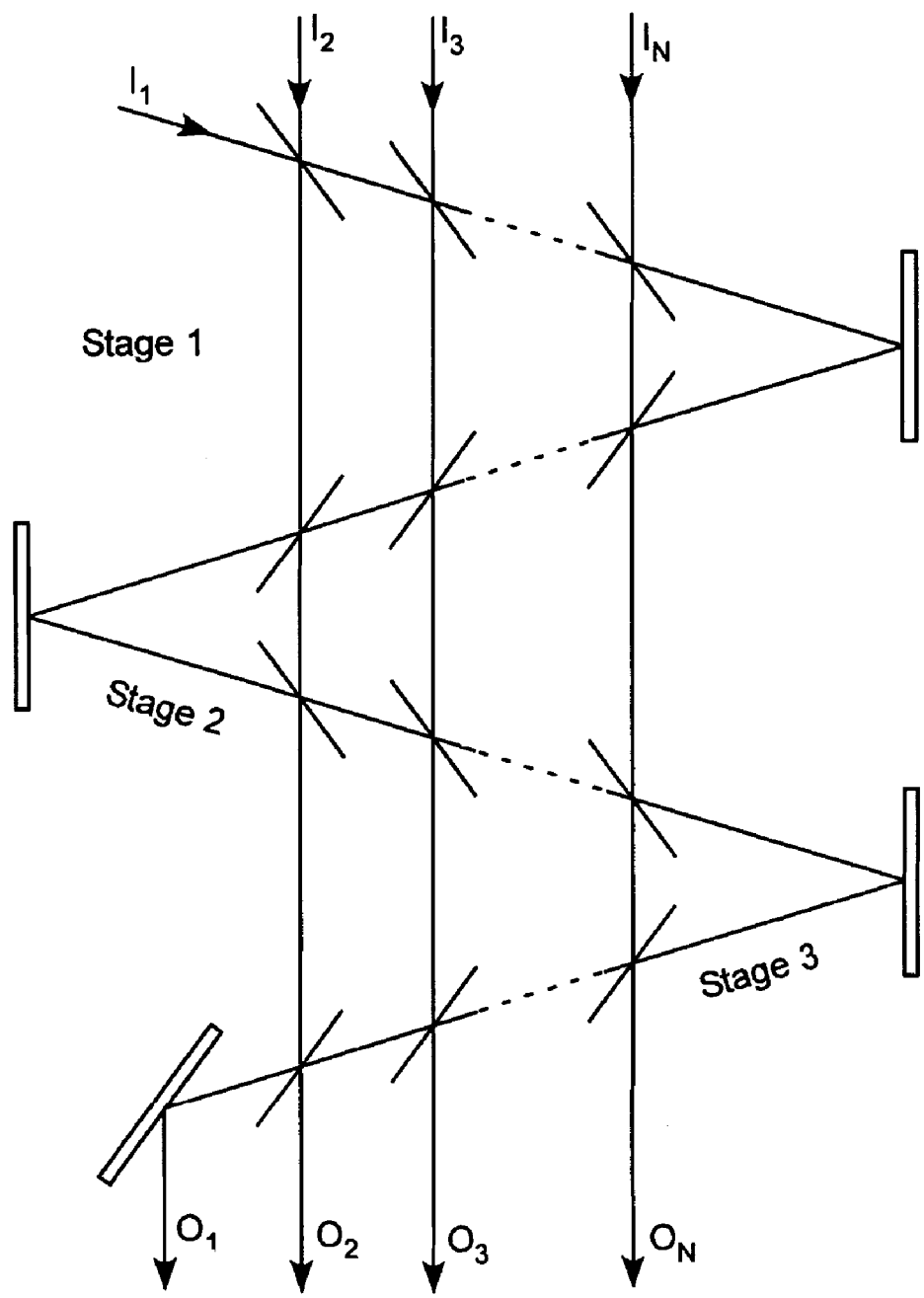
FIG. 11 schematically illustrates an embodiment of a beam-mixer in accordance with the present invention, in generalized form, arranged to mix N input beams to provide N mixed output beams in three stages of mixing.

FIG. 10 schematically illustrates an embodiment of a beam-mixer in accordance with the present invention similar to the embodiment of FIG. 9, but generalized for mixing N beams in a single stage with the stage including one mirror and 2*(N−1) beamsplitters. Note here that a requirement that each output beam include a portion of each input beam is met by the single stage and that subsequent stages would be required only if it were required to improve less-than-adequate mixing due to above discussed problems of R and T mismatch and polarization sensitivity of beamsplitters. A generalized three-stage embodiment of the inventive coupler for mixing N beams is schematically illustrated in FIG. 11. It should be noted that in stages subsequent to stage 1, the beams and portions thereof may propagate orthogonal to each other as in embodiments of the inventive beam-mixer discussed above with reference to FIGS. 6-8.

Figure 12:
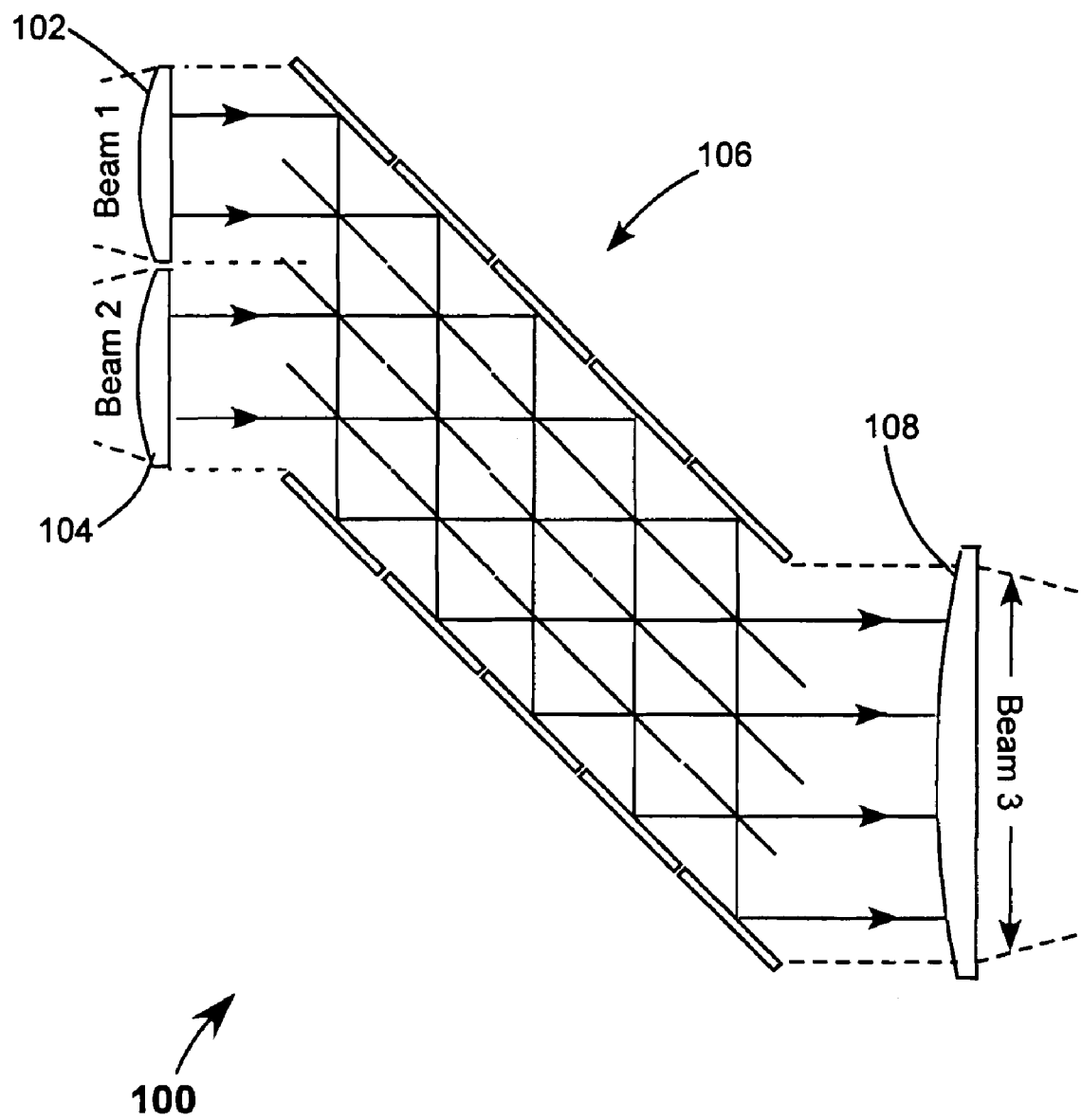
FIG. 12 schematically illustrates an embodiment in accordance with the present invention arranged to mix two input beams to provide one mixed output beam in five stages of mixing.

FIG. 12 schematically illustrates how a beam-mixer in accordance with the present invention may be used, in addition, as a beam-coupler for coupling N beams into M beams where M is less than N. Here, apparatus 100 includes apparatus 106 includes lenses 102 and 104 that collimate two input beams (Beam 1 and Beam 2 are designated as bounded by dashed lines) such that the collimated beams propagate side by side, parallel, as an near contiguous as possible, into the entrance aperture of a five-stage, four-beam, beam-mixer in accordance with the present invention. Each of the collimated beams entering the mixer is divided by the beamsplitters of the mixer into two portions, with each portion indicated by a single line. The beam portions are further divided and mixed in the beam-mixer as discussed above with reference to other embodiments of the inventive beam mixer. This results in four outputs each including some portion of each divided portion of the input beams. These outputs are collected by a lens 108 and treated as a single beam (Beam 3) by the lens. Beam 3 is, in effect, a homogenized coupling of beams 1 and 2. Those skilled in the art will recognize that beams 1 and 2 could be further homogenized by providing a mixer and coupler having more beamsplitters per stage, and correspondingly more stages, for example, seven beam splitters per stage, providing four channels per input beam, with nine stages of mixing.

In summary, the present invention is described and depicted herein with reference to a preferred and other embodiments. The invention is not limited, however, to the embodiments described and depicted. Rather, the invention is limited only by the claims appended hereto.

What is claimed is:

1. A method of combining a plurality of laser beams, comprising:
   mixing the plurality of laser beams to provide a plurality of mixed beams, each of said mixed beams including at least one portion of each of the laser beams; and
   directing said plurality of mixed beams toward each other such that said mixed beams intersect in a plane.

2. The method of claim 1, wherein said mixing step comprises dividing each beam into a plurality of beam portions propagating along a plurality of beam paths and directing at least one beam portion from each beam with at least one beam portion from each of the other beams along a common path to form said mixed beam.

3. The method of claim 1, wherein said mixed beam includes at least two portions of each of said laser beams and said laser beam portions are transversely oriented at 180 degrees to each other.

4. The method of claim 1, wherein N laser beams are combined to provide N mixed beams.

5. A method combining a plurality of laser beams, the method comprising the steps of:
   (i) dividing a first of the laser beams of the laser beams into first and second laser portions, traveling along respectively first and second paths;
   (ii) dividing a second of the laser beams into first and second portions;
   (iii) combining the first portion of said first beam with the first portion of said second beam along said first path, and combining the second portion of said first beam with the second portion of second beam along said second path, thereby transforming said first and second beams into corresponding first and second combined beams and
   (iv) repeating the operations of steps (i) and (ii) K times with the first and second combined beams of the previous operations to transform the first and second combined beams into first and second K-times-combined beams.

6. The method of claim 5, wherein the repetition number K is selected such that the first and second K-times-combined beams each have about the same characteristics.

7. A method for combining N laser beams, comprising the steps of:
   dividing each of the N laser beams laser beams into a plurality of beam portions; and
   combining said beam portions in N separate paths to form N combined beams each thereof containing two portions of each of the N beams wherein each of said N laser beams has a first transverse orientation, and said dividing and combining steps are arranged such that one of said two portions of each of said beams in a said combined beam has the first transverse orientation, and the other of said two portions of each of said beams in a said combined beam has a second transverse orientation at 180 degrees to said first orientation.

8. The method of claim 7, wherein N is 2 and wherein said dividing and combining steps include directing the two laser beams along first and second paths to a first reflective and transmissive beamsplitter such that one portion of each of the beams is transmitted by the beamsplitter along the first path to a second reflective and transmissive beamsplitter, and one portion of each of the beams is reflected by the beamsplitter along the second path; and reflecting the reflected beam portions to the second beamsplitter such that a first portion of each of portion of the beams is transmitted by the second beamsplitter along the second path and a second portion of each portion of the beams is reflected by the second beamsplitter along the first path.

9. In apparatus for projecting an image of a photomask on a substrate, a method of illuminating the photomask, comprising:
   mixing a plurality of laser-beams to provide a plurality of mixed laser-beams, each thereof including at least one portion of each of the other beams; and
   directing the mixed laser-beams beams such that the mixed laser beams intersect on the photomask.

10. The method of claim 9, further including the step of dividing each if the mixed beams into a plurality of beam portions, and wherein the beam division and directing steps provide that each of the beams is homogenized at the intersection the beams.

11. The method of claim 10, wherein two laser beams are mixed to provide two mixed laser-beams.

12. A method for combining N laser beams, comprising the steps of:
dividing each of the N laser beams laser beams into a plurality of beam portions;
combining said beam portions in N separate paths to form N combined beams each thereof containing one portion of each of the N beams;
directing said N combined beams toward each other such that said combined beams intersect in a plane.

13. A method of illuminating a photomask with first and second laser beams from two different lasers comprising the steps of:
dividing the first laser beam into first and second beam portions, the first beam portion propagating down a first beam path and the second beam portion propagating down a second beam path;
dividing the second laser beam into third and fourth portions and causing the third portion to propagate down said first beam path in a spatially overlapping manner with the first beam portion and causing the fourth beam portion to propagate down said second beam path in a spatially overlapping manner with the second beam portion; and
directing the spatially overlapping beams portions to intersect the photomask in a substantially coincident manner.

* * * * *